(12) United States Patent
Aukon

(10) Patent No.: US 7,042,113 B2  
(45) Date of Patent: May 9, 2006

(54) HYDROELECTRIC GENERATOR

(76) Inventor: Dennis W. Aukon, 11908 Carter Ave., SW., Port Orchard, WA (US) 98367

( * ) Notice: Subject to any disclaimer, the term of this patent is extended or adjusted under 35 U.S.C. 154(b) by 119 days.

(21) Appl. No.: 10/501,907

(22) PCT Filed: Jan. 21, 2003

(86) PCT No.: PCT/US03/01982

§ 371 (c)(1),
(2), (4) Date: Jul. 16, 2004

(87) PCT Pub. No.: WO03/067749

PCT Pub. Date: Aug. 14, 2003

(65) Prior Publication Data

US 2005/0173927 A1    Aug. 11, 2005

Related U.S. Application Data

(60) Provisional application No. 60/349,494, filed on Jan. 18, 2002.

(51) Int. Cl.
*F03B 13/00* (2006.01)

(52) U.S. Cl. ............................ 290/54; 416/119; 290/43
(58) Field of Classification Search ................. 290/42, 290/43, 53, 54, 55; 416/119, 111
See application file for complete search history.

(56) References Cited

U.S. PATENT DOCUMENTS

| | | | |
|---|---|---|---|
| 833,361 A | 10/1906 | Wilmore | |
| 2,097,286 A | 10/1937 | McGee | 290/54 |
| 2,222,790 A | 11/1940 | Scharrel | 290/54 |
| 2,730,631 A | 1/1956 | Dandini | 290/54 |
| 4,023,041 A * | 5/1977 | Chappell | 290/53 |
| 4,104,536 A * | 8/1978 | Gutsfeld | 290/54 |
| 4,239,976 A | 12/1980 | Collard | 290/42 |
| 4,301,377 A * | 11/1981 | Rydz | 290/43 |
| 4,350,474 A * | 9/1982 | Murphy | 416/7 |
| 4,467,218 A * | 8/1984 | Andruszkiw et al. | 290/54 |
| 4,636,141 A * | 1/1987 | Sedlacek | 416/86 |
| 4,843,249 A * | 6/1989 | Bussiere | 290/53 |
| 5,082,423 A * | 1/1992 | Morgan | 416/11 |
| 5,677,582 A | 10/1997 | Lutz et al. | 310/75 R |
| 5,834,853 A * | 11/1998 | Ruiz et al. | 290/54 |
| 6,455,947 B1 | 9/2002 | Lilley et al. | 290/40 C |
| 2003/0085628 A1 | 5/2003 | Miyazaki et al. | 310/99 |

* cited by examiner

*Primary Examiner*—Nicholas Ponomarenko
(74) *Attorney, Agent, or Firm*—Seed IP Law Group PLLC

(57) ABSTRACT

A hydroelectric generator having a fixed axle, at least one transmission axle parallel to the fixed axle, and a transmission system configured to rotate the transmission axle about the fixed axle and to apply a force to at least one driven member of a device for generating electricity.

9 Claims, 8 Drawing Sheets

HYDROELECTRIC GENERATOR

BACKGROUND OF THE INVENTION

1. Field of the Invention

The present invention is directed to a hydroelectric generator, and more particularly, to a hydroelectric generator utilizing an efficient transmission system within a rotatable drum impelled by water.

2. Description of the Related Art

Hydroelectric generators use the force of moving water to generate electrical energy. Typically, moving water drives a transmission system that in turn drives a device to generate electricity, such as a direct current electrical generator or an alternator.

An example of a known hydroelectric generator is disclosed in U.S. Pat. No. 833,361, issued to Wilmore ("Wilmore"). Wilmore includes a frame that is supported by chains attached to posts. A rotary casing is mounted on the frame. Waves or river currents or flowing streams impact on the casing to spin the casing around three fixed shafts contained within the casing. As the casing spins in one direction, gearing attached to the three fixed shafts causes a drive on a generator to spin, thereby generating electricity. The gearing system disclosed by Wilmore does not provide rotational forces in more than one direction to multiple generator units.

Another hydroelectric generator is disclosed in U.S. Pat. No. 2,097,286, issued to McGee ("McGee"). McGee discloses an electrical power generating apparatus in which a water-tight, buoyant cylindrical shell has a circumferential series of blades extending therefrom. Gearing inside the shell causes a stator and an armature to move in relatively opposite directions, thereby producing electrical current. As with Wilmore, however, the gearing system disclosed by McGee, as well as the gearing system in other hydroelectric generators, is not adaptable to accommodate multiple generating devices or to rotate both elements of a generation device with respect to the shell.

It is desirable for a hydroelectric generator to have an efficient transmission system and to be adaptable and portable for use with a wide variety of sources of moving water, such as streams and river currents, tides, and falling water. It is also desirable that the transmission system be adaptable to permit use with a wide variety of devices that generate electricity.

BRIEF SUMMARY OF THE INVENTION

The disclosed embodiments of the present invention are directed to a hydroelectric generator configured to use the force of water to orbit a plurality of axles around a stationary axle, which in turn causes the components of a device that generates electrical energy to rotate, and thereby generate electrical energy. An efficient and adaptable mechanical transmission system is employed, enabling the generator to be used with a wide variety of sources of moving water, such as streams, rivers, tides, waterfalls, flowing currents, ocean currents and the like.

In accordance with one embodiment of the invention, a hydroelectric generator is provided that includes a support to secure the generator with respect to a source of moving water, a fixed axle attached to the support, a transmission axle rotatably attached to the support and positioned in parallel to the fixed axle, and a transmission system to orbit the transmission axle around the fixed axle and to drive a first driven member of a device for generating electricity.

In accordance with another embodiment of the invention, the transmission system is configured to drive a second driven member of a device for generating electricity. In accordance with another embodiment of the invention, the generator includes a second transmission axle. In accordance with yet another embodiment of the present invention, the transmission system drives two driven members of each of two devices for generating electricity.

BRIEF DESCRIPTION OF THE SEVERAL VIEWS OF THE DRAWINGS

The foregoing features and advantages will be more appreciated as the same become better understood from the following detailed description when taken in conjunction with the accompanying drawings, wherein.

DETAILED DESCRIPTION OF THE INVENTION

The present invention provides for a hydroelectric generator having an efficient transmission system that can be adopted for use with a variety of sources of moving water. Embodiments of the invention will be described using a limited number of representative examples and drawings.

Figure 1:
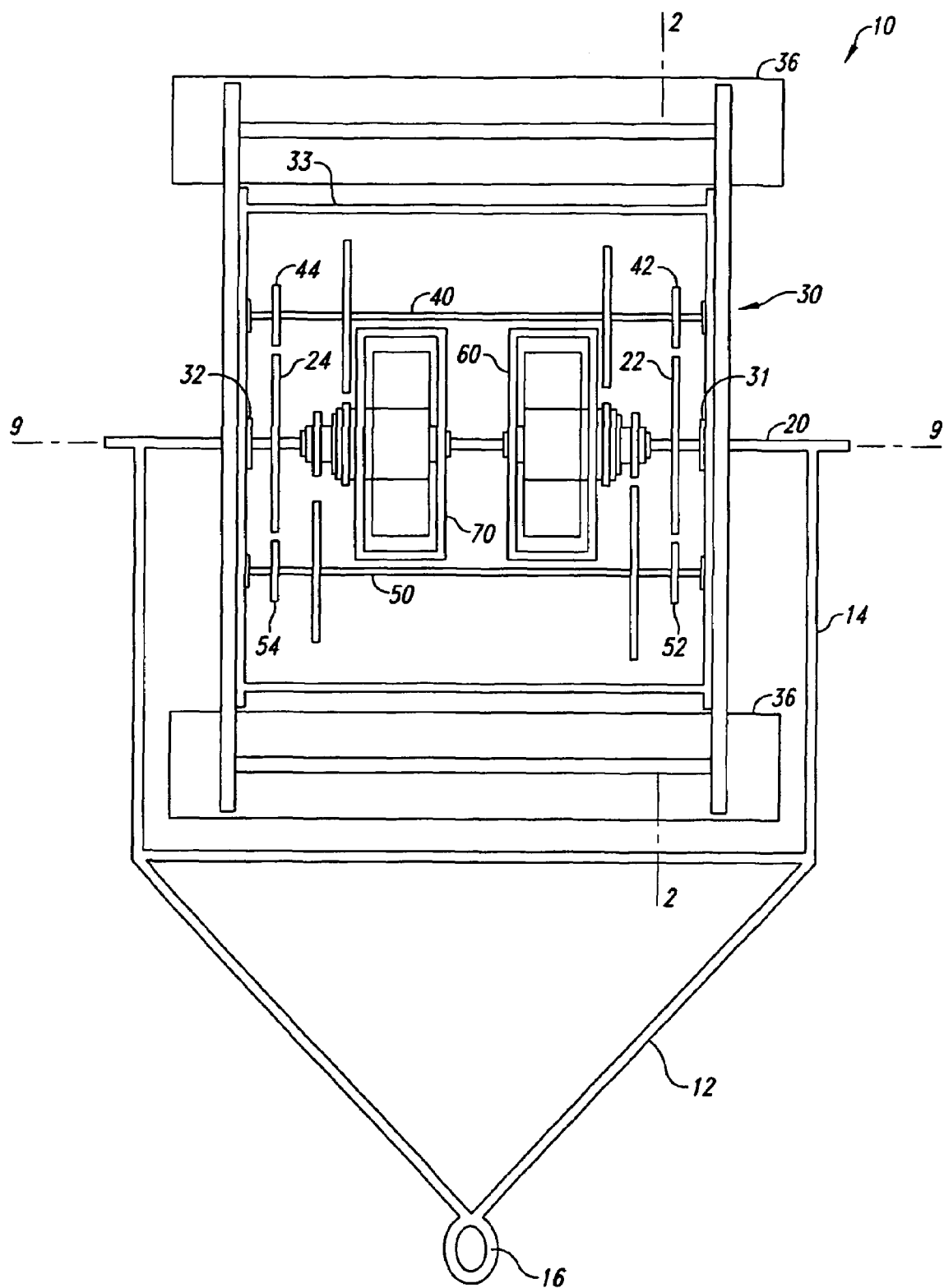
FIG. 1 is an internal top view of an embodiment of a hydroelectric generator formed in accordance with the present invention.
Figure 2:
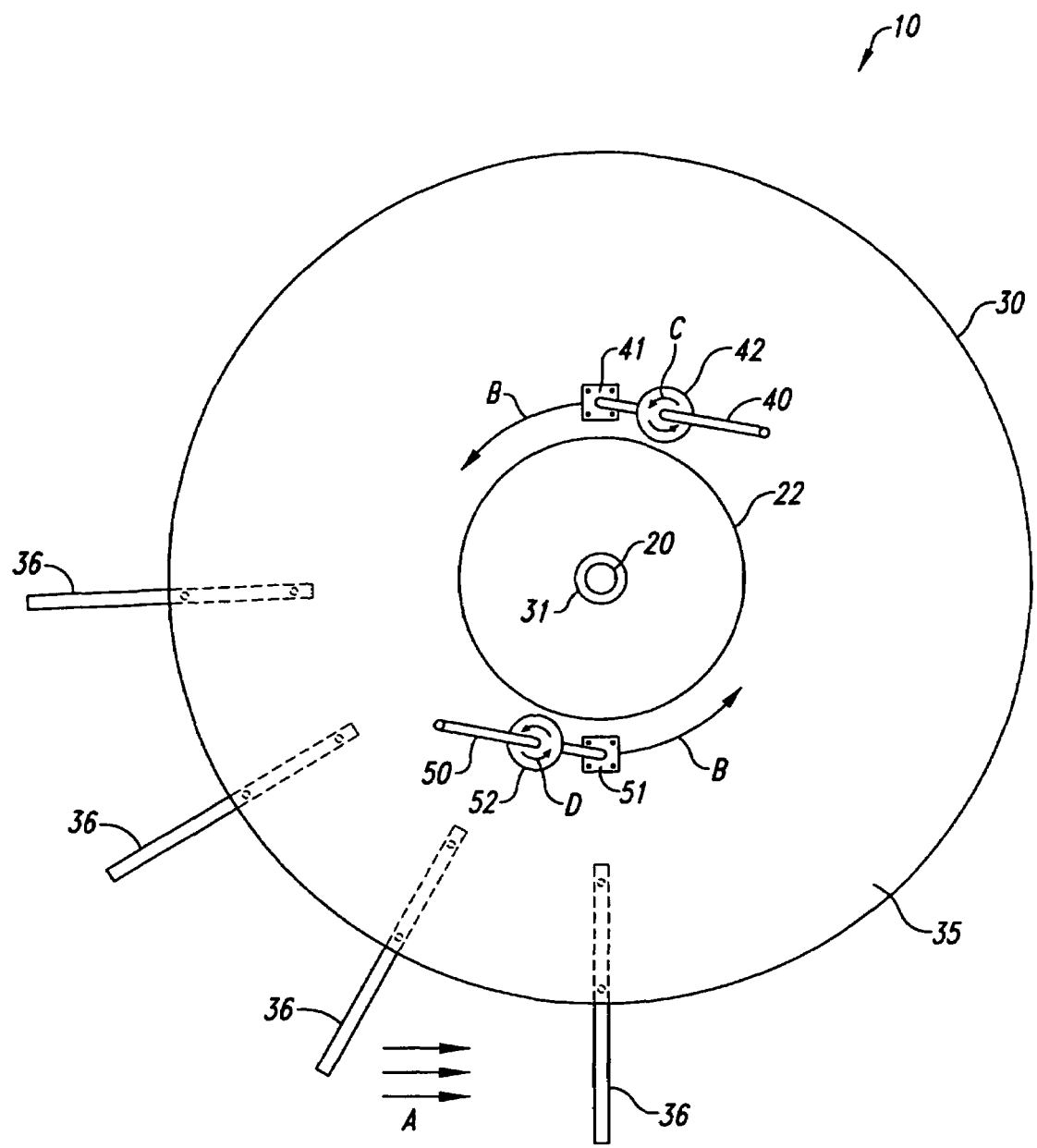
FIG. 2 is a partial cross-sectional side view of the embodiment of FIG. 1, taken along line 2—2.
Figure 3:
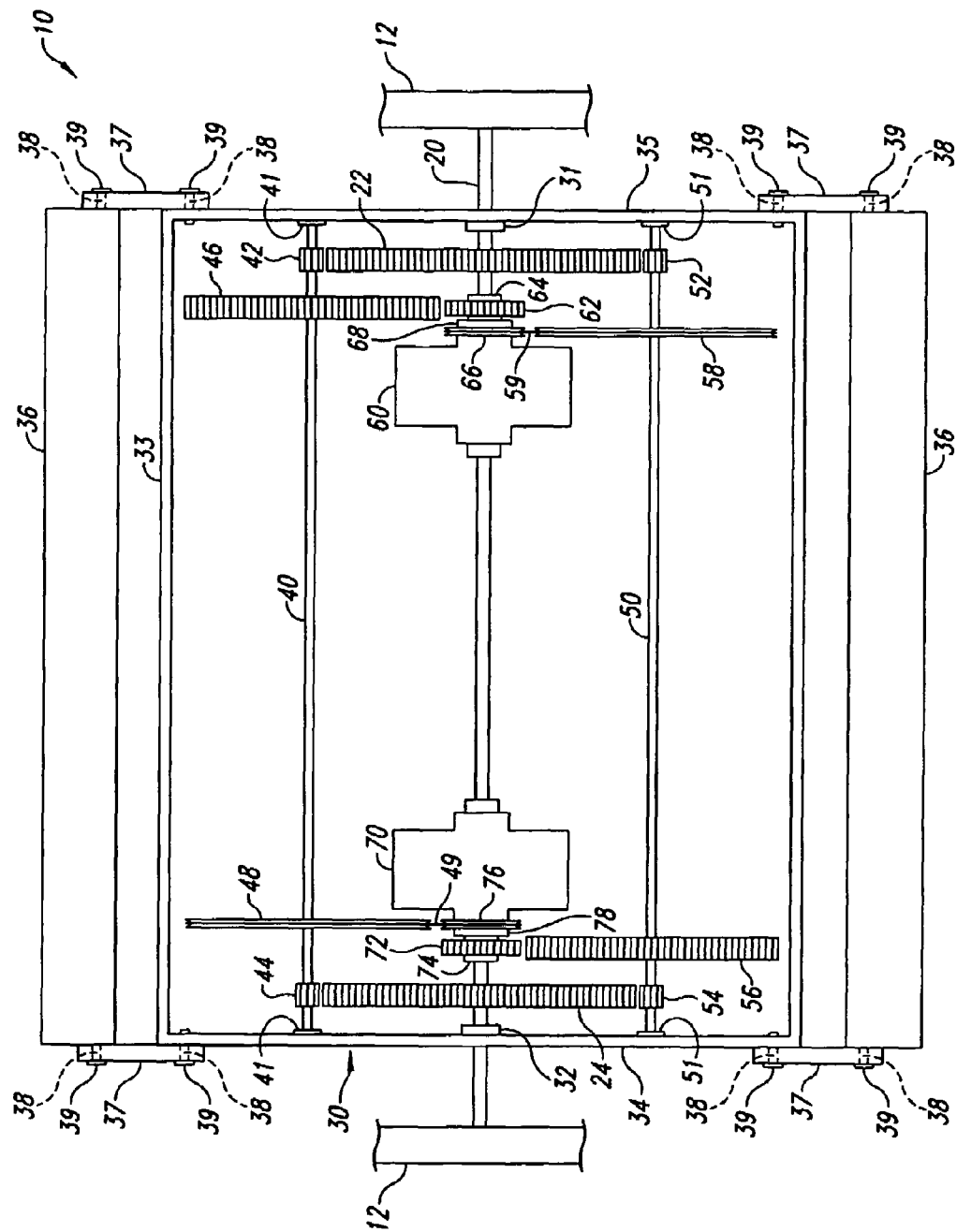
FIG. 3 is another enlarged internal top view of a portion of the embodiment of FIG. 1.

Referring now to FIGS. 1–3, a support 12 secures the hydroelectric generator 10 to the earth (not shown) or to a structure (not shown). As shown more clearly in FIG. 1, the support 12 has a yoke 14 and a mount 16. The mount 16 secures the support to the earth (not shown) or to a structure (not shown). One of skill in the art will recognize that alternative supports may be used. For example, cables attached to the river bottom or to the river bank could be employed. Alternatively, two poles anchored to the bottom of a body of water could be employed. The support could be formed of two anchors holding the hydroelectric generator in position in a waterfall. In FIGS. 1–3, a central axle 20 is rigidly fixed to the yoke 14 on the support 12. The central axle 20 does not rotate.

A drum 30 is rotatably mounted on the central axle 20 on bearings 31, 32. The drum 30 has a conventional shape, and it includes a cylindrical sidewall 33 and two planer end walls 34, 35 to be water tight. This allows the hydroelectric generator 10 to float in circumstances where that is desirable. It also protects the internal components from exposure to the water. The drum 30 has a longitudinal axis that is coaxial with the central axle 20.

A plurality of paddles 36 depend outward from the end walls 34, 35 of the drum 30 and are attached to the end walls 34, 35 using mounting bars 37. The use of mounting bars 37, which may contain multiple mounting holes 38 for mounting bolts 39, allows for easy adjustment of the radial distance between the paddles 36 and the sidewall 33. Ideally, the paddles 36 project at a right angle from an attachment point that is tangential to the side wall 33.

A first transmission axle 40 is rotatably mounted inside the drum 30. An optional second transmission axle 50 also is rotatably mounted inside the drum 30. More particularly, the first and second transmission axles 40, 50 are journaled in bearings 41, 51 formed in the end walls 34, 35. When moving water (not shown) engages the paddles 36, the force of the water will impel the drum 30 about the central axle 20. The first and second transmission axles 40, 50 will rotate about the central axle 20 with the drum 30.

A non-rotating sun gear 22 is coupled to the central axle 20. The sun gear 22 engages a first pinion gear 42 on the first transmission axle 40 and an optional second pinion gear 52 on the second transmission axle 50. An optional second sun gear 24 engages an optional third pinion gear 44 on the first transmission axle 40 and an optional fourth pinion gear 54 on the second transmission axle 50. As the first and second transmission axles 40, 50 orbit about the central axle 20, the engagement of the first sun gear 22 with the first and second pinion gears 42, 52 and the engagement of the second sun gear 24 with the third and fourth pinion gears 44, 54 will cause the first and second transmission axles 40 and 50 to rotate as they orbit about the central axle 20. The use of large sun gears, 22, 24 and smaller pinion gears, 42, 44, 52, 54, enables slow rotation of the drum 30 to cause a faster rotation of the transmission axles 40, 50. One of skill in the art will recognize that the gearing ratio can be optimized for a particular application.

A first electrical generator 60 and an optional second electrical generator 70 are mounted on the central axle 20. One of skill in the art will recognize that the first and second electrical generators 60, 70, may be any device that generates electricity using one or more driven members, such as a direct current electrical generator or an alternator.

A first drive gear 46 is coupled to the first transmission axle 40 between the first pinion gear 42 and the third pinion gear 44 and engages a first driven gear 62 that is coupled to a first driven member 64 for the first generator 60. An optional second drive gear 56 is coupled to the second transmission axle 50 between the second pinion gear 52 and the fourth pinion gear 54 and engages an optional second driven gear 72 that is coupled to a first driven member 74 for the second generator 70. As the first and second transmission axles 40, 50 rotate, the first and second drive gears 46, 56 will rotate in the same direction as the transmission axles 40, 50. This will cause the first and second driven gears 62, 72 to rotate in the opposite direction of the transmission axles 40, 50, thus applying a driving force to the first driven members 64, 74 for the respective first and second generators 60, 70.

An optional first pulley sheave 48 is coupled to the first transmission axle 40 between the first drive gear 46 and the third pinion gear 44. Similarly, an optional second pulley sheave 58 is coupled to second transmission axle 50 between the second drive gear 56 and the second pinion gear 52. The first pulley sheave 48 is coupled to a third pulley sheave 76 by a first belt 49. The second pulley sheave 58 is coupled to a fourth pulley sheave 66 by a second belt 59. The fourth pulley sheave 66 is coupled to a second driven member 68 for the first generator 60 and the third pulley sheave 76 is coupled to a second driven member 78 for the second generator 70. As the first transmission axle 40 rotates, the first pulley sheave 48 and the third pulley sheave 76 will rotate in the same direction. Similarly, as the second transmission axle 50 rotates, the second pulley sheave 58 and the fourth pulley sheave 66 will rotate in the same direction. Thus, the first driven member 64 and the second driven member 68 for the first generator 60 will rotate in opposite directions. Similarly, the first driven member 74 and the second driven member 78 for the second generator 70 will rotate in opposite directions. Thus, the two counter-rotating components also will be rotating relative to the drum 30.

One of skill in the art will recognize that other means may be employed to convert the rotation of the transmission axles into a driving force for the generators, such as a system using chains and sprockets as opposed to a system of pulleys, belts and gears, or some combination of the above. One of skill in the art will also recognize that the hydroelectric generator 10 may contain only one device for generating electricity, and that a device having only one driven member can be utilized as opposed to the illustrated devices with two driven members. It also will be appreciated that the central axle 20 and the transmission axles 40 and 50 need not extend all the way through the drum as illustrated in FIG. 1. Further, one of skill in the art will recognize that shapes other than a drum may be employed to house the hydroelectric generator.

Referring now to FIG. 2 in particular, a plurality of paddles 32 are coupled to an end plate 35 of drum 30. The force from flowing water, indicated by arrow A, strikes one of the paddles 36, and impels the drum 30 about the central axle 20. The drum 30 and the first and second transmission axles 40, 50 orbit about the central axle 20 in the direction illustrated by arrow B. The first sun gear 22 engages the first and second pinion gears 42, 52. The orbiting of the first and second pinion gears 42, 52 over the first sun gear 22 as the drum rotates causes the first and second transmission axles 40, 50 to rotate in the direction indicated by arrows C and D.

Figure 4:
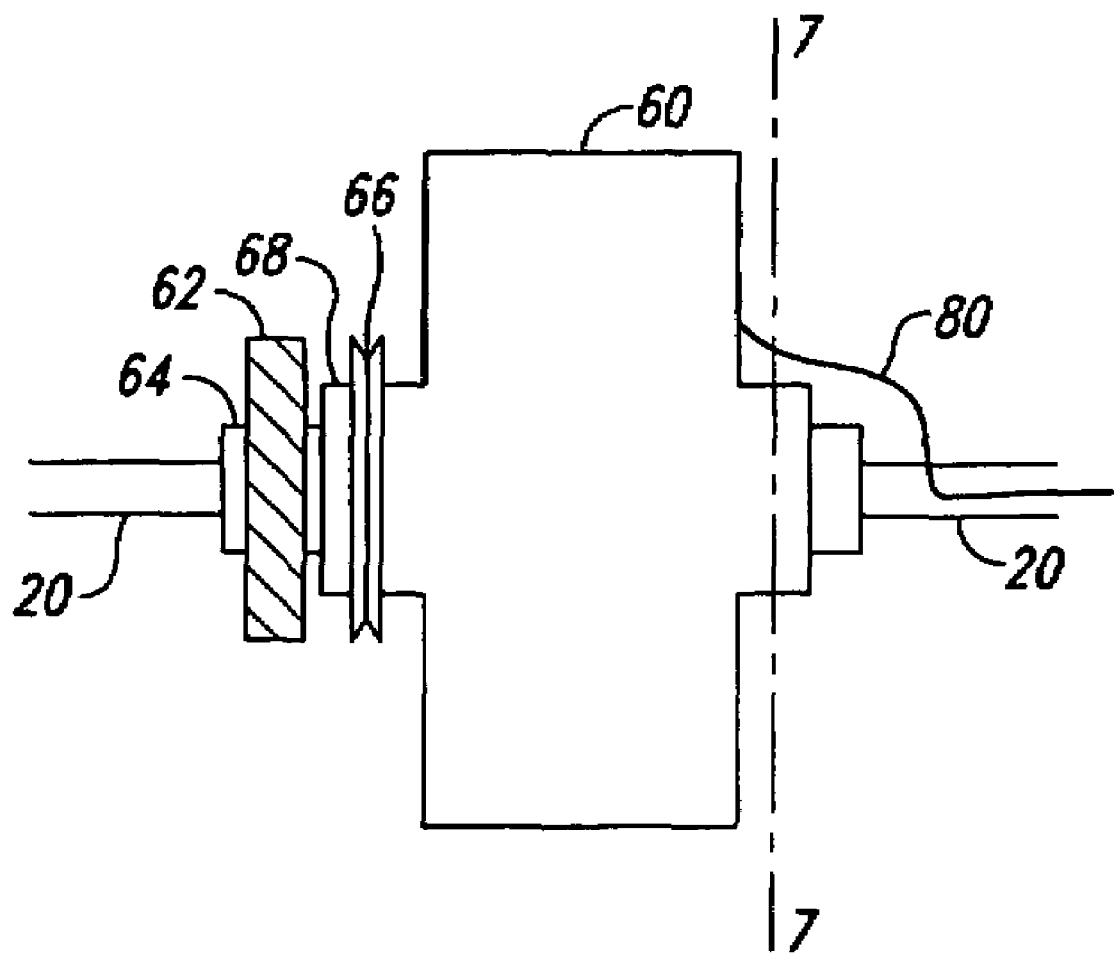
FIG. 4 is a side view of a device for generating electricity configured for use with the present invention.
Figure 5:
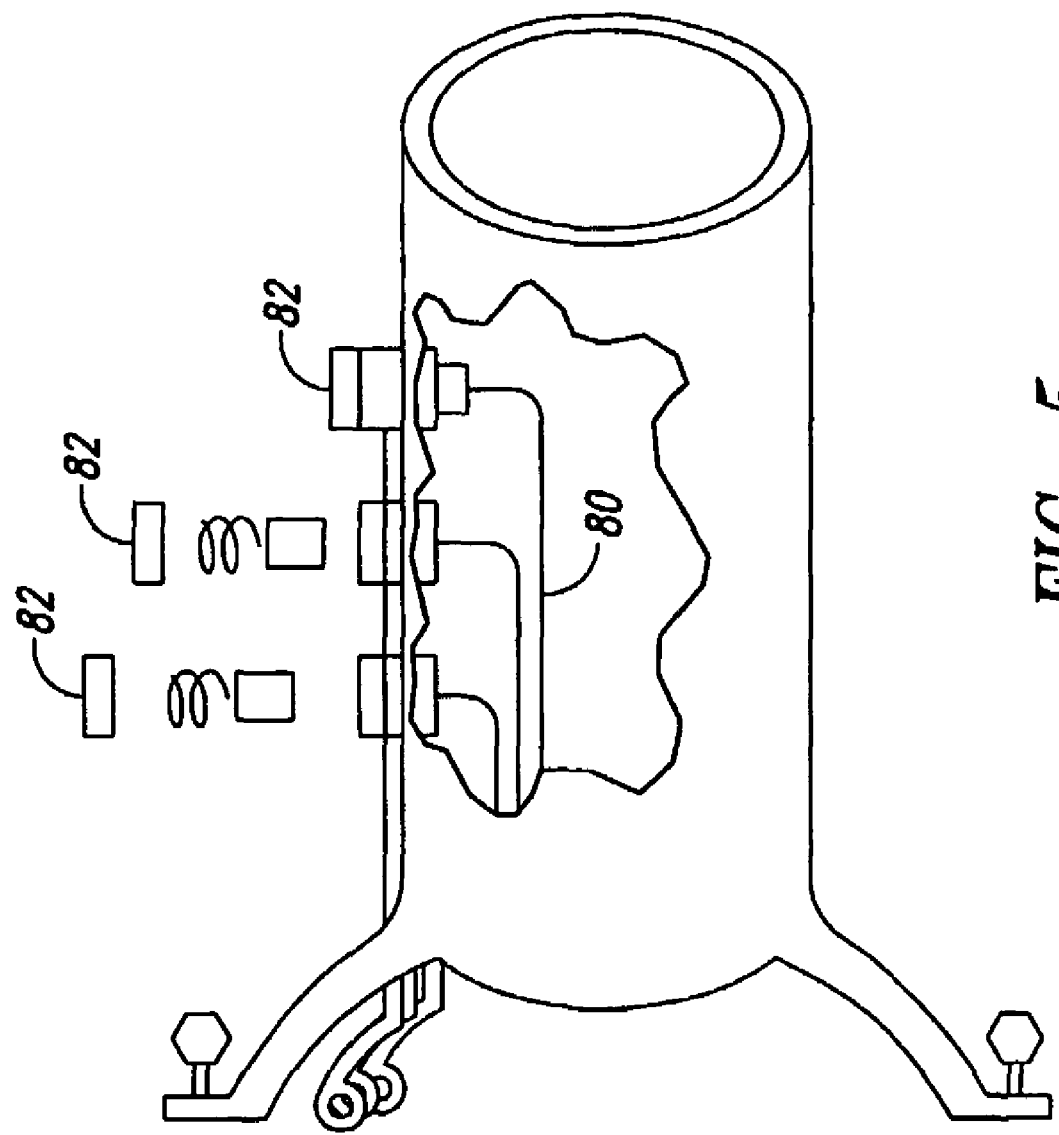
FIG. 5 illustrates electrical bushings that can be used in a hydroelectric generator formed in accordance with the present invention.

FIG. 4 illustrates in more detail an electrical generator 60 that can be used with the hydroelectric generator 10 of the present invention. A central axle 20 is journalled. Electrical wiring 80 runs from the generator 60 into the journalled central axle 20. The electrical wiring 80 conducts electricity generated by the generator 60 to a remote location (not shown) where the electricity can be utilized. FIG. 5 illustrates another embodiment of a journalled central axle 20 with electrical bushings 82 that could be used to conduct electricity from a rotating portion of an electrical generator such as a rotating wire coil (See FIG. 6) to the electrical wiring 80 for transmission to a remote location. One of skill in the art will recognize that electrical generators may provide either bushing connections or wiring connections as a matter of design choice.

Figure 6:
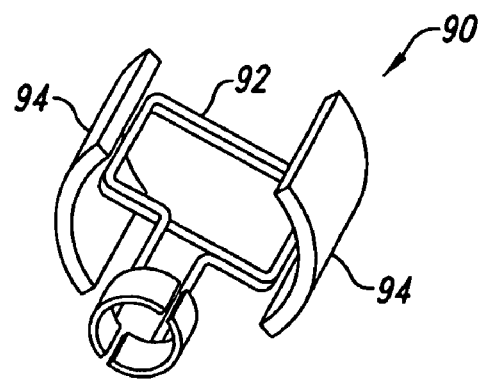
FIG. 6 is another partial illustration of a device for generating electricity configured for use with the present invention.

FIG. 6 illustrates a direct current electrical generator 90 that can be used with the present invention. A coil of wire 92 is rotated between the poles of a magnet 94. This produces an electrical current in the coil of wire 92. One of skill in the art will recognize that alternative devices for generating electricity are available and can be used with the present invention. For example, a magnet could be rotated inside a ring of coils.

Figure 7:
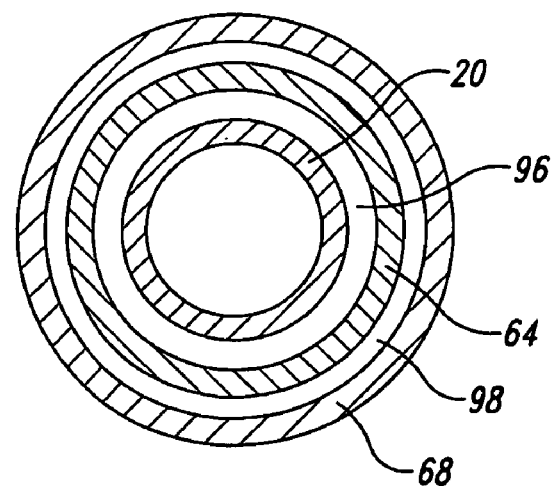
FIG. 7 is a partial cross-sectional view of the device for generating electricity of FIG. 4 taken along lines 7—7.

FIG. 7 illustrates a bearing system that can be used with the electrical generator of FIG. 4. A non-rotating central axle 20 is journalled, which allows the central axle 20 to serve as a conduit for electrical wiring 80 (see FIG. 4). A journalled first driven member 64 coaxial with central axle 20 rides on a first bearing 96 separating the first driven member 64 from the central axle 20. A second driven member 68 coaxial with the central axle 20 rides on a second bearing 98 separating the first driven member 64 from the second driven member 68.

Figure 8:
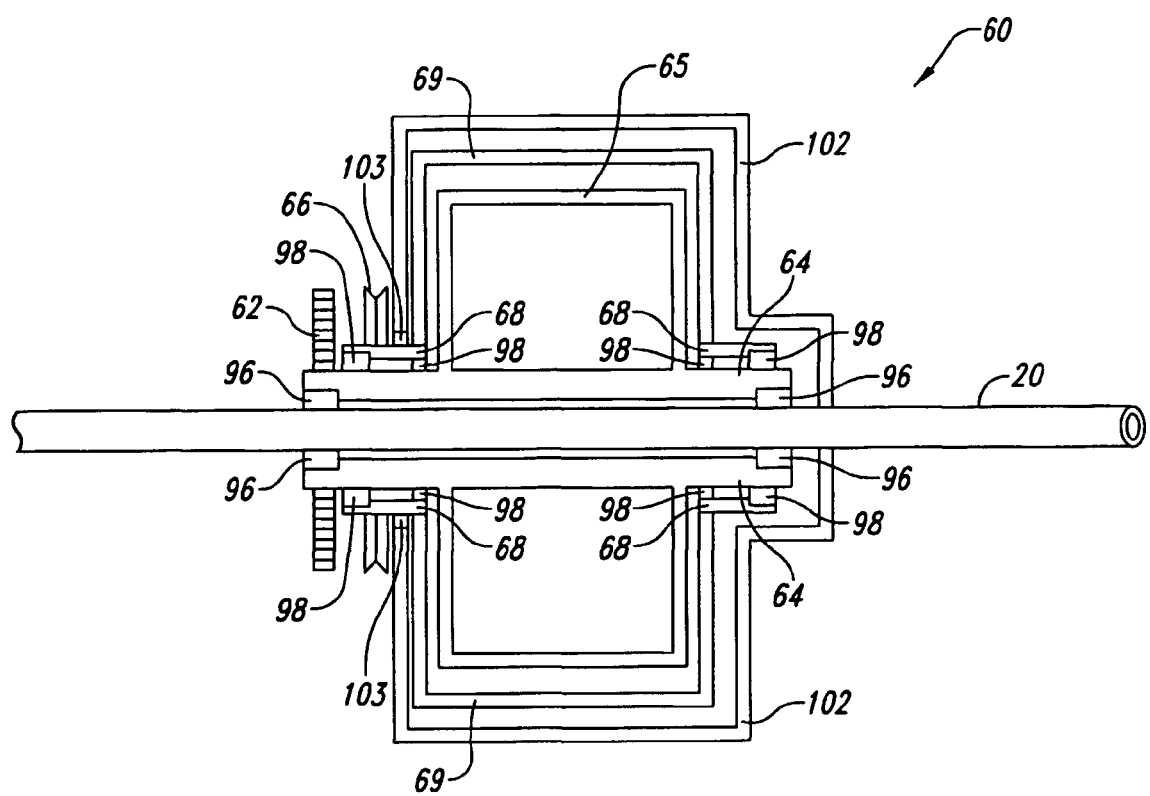
FIG. 8 is a detailed partial cross-sectional view of the device for generating electricity of FIG. 4.

FIG. 8 illustrates in more detail a device for generating electricity 60 that can be used with the present invention. The first driven member 64 of electrical generator 60 rides over the central axle 20 on a first pair of bearings 96. The first driven member 64 is coupled to the first driven gear 62 and a first mount 65. The second driven member 68 of the electrical generator 60 rides over the first driven member 64 on a second set of bearings 98. The second driven member 68 is coupled to the fourth pulley sheave 66 and a second mount 69. An optional housing 102 may be mounted on the central axle 20 and ride on the second driven member 68 on a third bearing 103. A magnet 94 (see FIG. 6) may be coupled to the first mount 65 and a wire coil 92 (see FIG. 6) may be coupled to the second mount 69. Alternatively, the wire coil 92 may be coupled to the first mount 65 and the magnet 94 may be coupled to the second mount 69. It will be appreciated that bushings 82 and bush rings 99 may be employed to connect the electrical generator 60 to electrical wiring 80 (see FIGS. 5 and 9).

Figure 9:
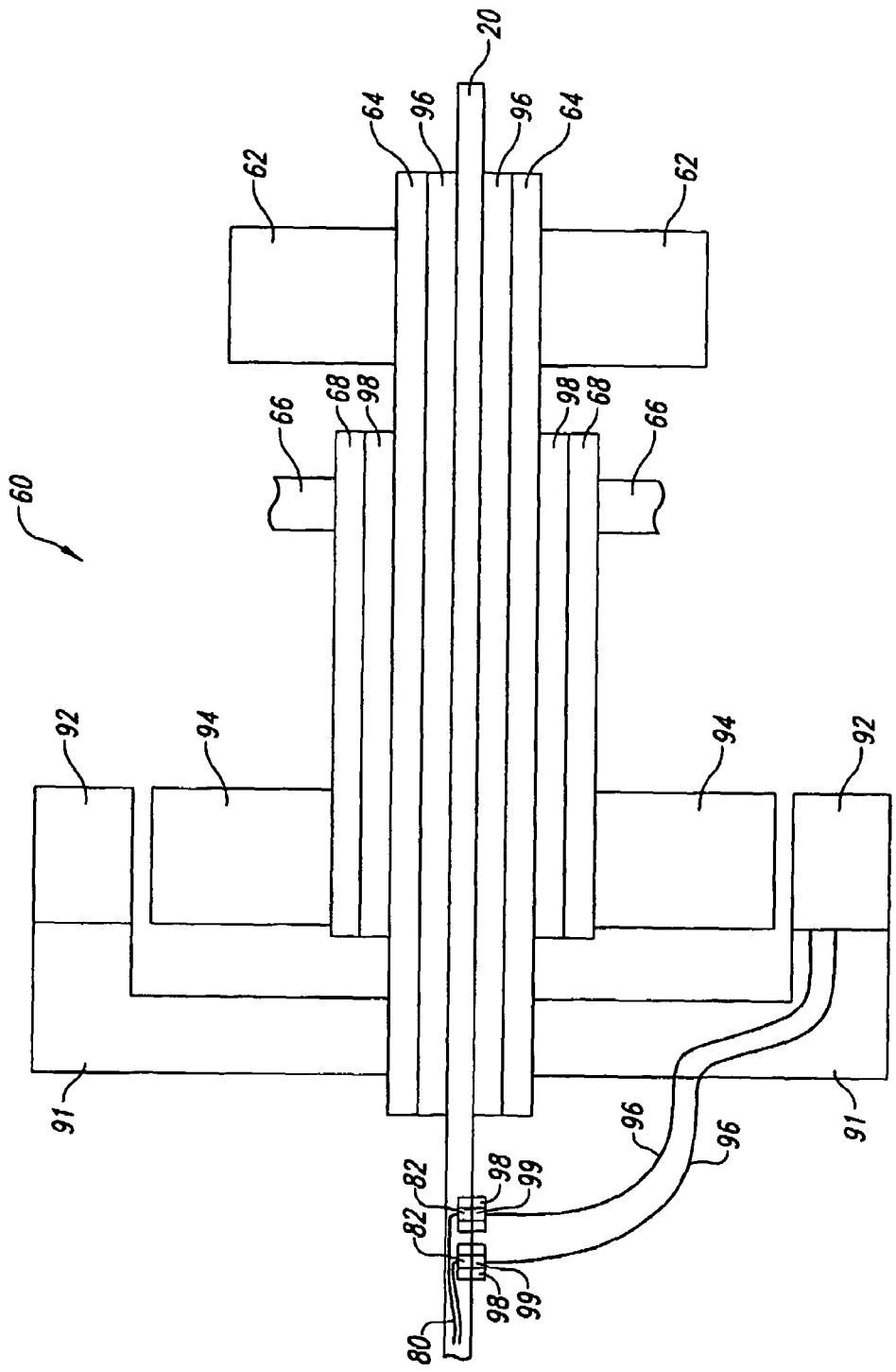
FIG. 9 is a partial cross-sectional view of a device for generating electricity that can be employed in the embodiment of FIG. 1, taken along lines 9—9 of FIG. 1.

FIG. 9 illustrates another electrical generator 60 that can be used in the hydroelectric generator 10 of FIG. 1. The first driven member 64 of the first electrical generator 60 rides over the central axle 20 on a first bearing 96. The first driven member 64 is coupled to the first driven gear 62 and to a wire coil mount 91. A wire coil 92 is mounted on the wire coil mount 91. Wire leads 96 connect the wire coil 92 to bush rings 99. One of skill in the art will recognize that the bush rings 99 may or may not have gaps. The bush rings 99 engage bushings 82 in the central axle 80. Electrical wiring 80 is coupled to the bushings 82 to conduct electricity to a remote location (not shown). Insulators 98 provide electrical insulation as needed.

The second driven member 68 of the first electrical generator 60 rides over the first driven member 64 on a second bearing 98 between the first driven gear 62 and the wire coil mount 91. The second driven member 68 is coupled to the fourth pulley sheave 66 and the magnet 94. The first driven gear 62 is rotated in one direction, which results in the wire coil 92 being rotated in the same direction. The fourth pulley sheave 66 is rotated in the opposite direction of the first driven gear 62, which results in the magnet 94 being rotated in the opposite direction of the wire coil 92. It will be appreciated that the first and second bearings 96, 98 may each consist of a plurality of individual bearings, as illustrated in FIG. 8.

Thus, a slow rotation of the drum 30 results in a faster rotation of both the wire coil 92 and the magnet 94 in opposite directions.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A hydroelectric generator for use with moving water, comprising:
   a support configured to secure the hydroelectric generator with respect to the moving water;
   a fixed axle coupled to the support;
   a transmission axle coupled to the support via a coupling device and in parallel to the fixed axle;
   a first mechanical transmission system configured to orbit the transmission axle about the fixed axle;
   a second mechanical transmission system configured to spin the transmission axle; and
   a third mechanical transmission system configured to drive a first driven member of a device for generating electricity;
   wherein the first mechanical transmission system comprises:
   a drum rotatably coupled to the fixed axle, wherein the transmission axle is rotatably mounted within the drum; and
   a plurality of paddles depending from the drum and configured to receive a force applied by the moving water to cause the drum and the transmission axle to orbit about the fixed axle;
   wherein the second mechanical transmission system comprises a sun gear coupled to the fixed axle for engaging a pinion gear coupled to the transmission axle; and
   wherein the third mechanical transmission system comprises a gear coupled to the transmission axle that engages a gear configured to drive the first driven member of the device for generating electricity.

2. The hydroelectric generator of claim 1, wherein the drum contains a water-tight compartment.

3. The hydroelectric generator of claim 1 wherein the gearing ratio between the sun gear and the pinion gear is at least an 8 to 1 ratio.

4. The hydroelectric generator of claim 1, wherein the third mechanical transmission system comprises a drive member coupled to the transmission axle and configured to drive the first driven member of the device for generating electricity.

5. The hydroelectric generator of claim 1, wherein the third mechanical transmission system is configured to drive a first driven member of a direct current electrical generator.

6. The hydroelectric generator of claim 1, wherein the third mechanical transmission system is configured to drive the first driven member of an alternator.

7. The hydroelectric generator of claim 1, wherein the third mechanical transmission system is configured to drive a plurality of driven members of a device for generating electricity.

8. The hydroelectric generator of claim 7, wherein the third mechanical transmission system is configured to drive a first driven member of a device for generating electricity in a first direction and a second driven member of a device for generating electricity in a second direction.

9. The hydroelectric generator of claim 8, further comprising a device for generating electricity, wherein a first driven member of the device for generating electricity is coupled to a coil of wire and a second driven member of the device for generating electricity is coupled to a magnet.

* * * * *